Nov. 29, 1960 M. B. LUCKER 2,962,261
LIFTING JACK
Filed July 13, 1954
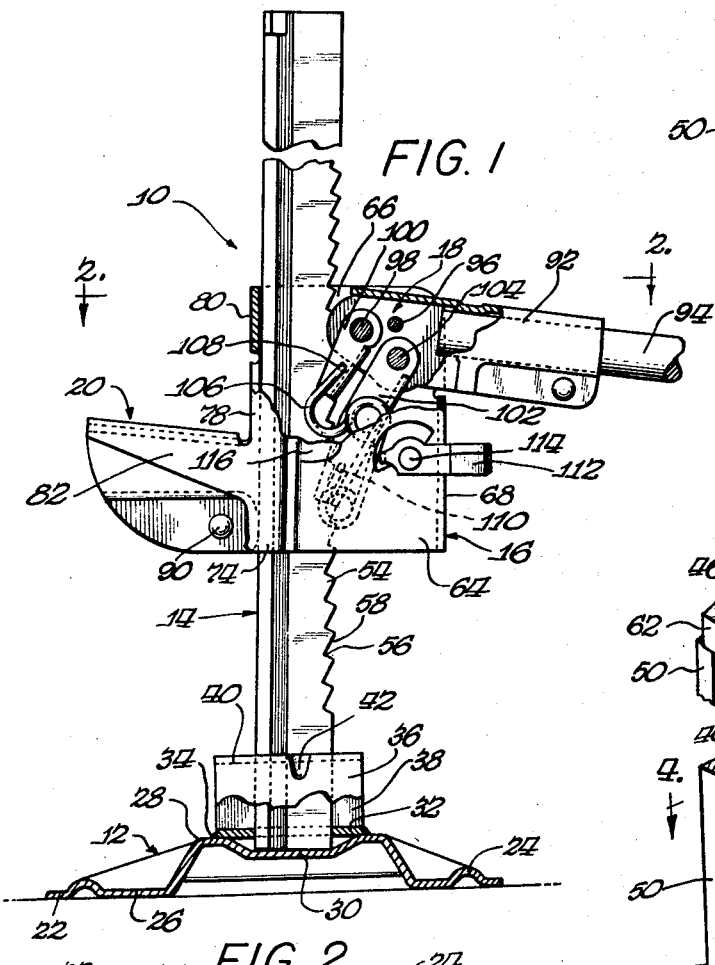
INVENTOR
MILLARD B. LUCKER
BY Moore, Prangley & Clayton
ATTORNEYS

United States Patent Office 2,962,261
Patented Nov. 29, 1960

2,962,261

LIFTING JACK

Millard B. Lucker, St. Joseph, Mich., assignor to Auto Specialties Manufacturing Company, St. Joseph, Mich., a corporation of Michigan Filed July 13, 1954, Ser. No. 443,016

5 Claims. (Cl. 254—110)

This invention relates to lifting jacks and more particularly to a lifting jack having an improved rack bar.

The automobile jack of the present invention is of the type in which a toothed rack bar is supported in substantially a vertical position and a load support is carried by a housing that also carries a ratchet mechanism which engages with the toothed bar to move the housing and the load support in a vertical direction along the toothed rack bar. The load engaging member is adapted to engage the bumper or some similar projection on an automobile whereby the automobile is lifted upon actuation of the ratchet mechanism. Jacks of this type are adapted to be disassembled and stored in the luggage compartment or trunk of an automobile until needed. Accordingly, it is desirable that the jack and all its parts be as light as possible and as compact as possible. Compactness and light weight must be achieved without sacrificing structural strength and rigidity since safety in use of the jack depends upon these latter factors.

Jacks of this type are used infrequently and it is therefore desirable that the jacks be as inexpensive as possible consistent with strength and safety. It is therefore desirable that all of the parts of the jack including the ratchet bar be susceptible to fabrication for inexpensive material by simple and inexpensive forming operations.

Accordingly, it is an object of the present invention to provide an improved automobile jack of the type set forth which is smaller and lighter and yet possesses the necessary strength to insure safety in operation.

More specifically it is an object of the present invention to provide a ratchet bar for lifting jacks of the type set forth which has a modified Y-shape which can be formed by rolling operations, the teeth on the Y-bar being formed by a simple one stroke stamping operation.

In connection with the foregoing object it is another object of the invention to provide a Y-shaped rack bar for use in automobile jacks which is stronger than other shaped bars of the same weight.

Another object of the invention is to provide a rack bar for automobile jacks of the type set forth which is shaped as a modified Y so that the arms thereof provide a simple means to prevent rotation of the housing carrying the actuating mechanism and load support about the rack bar.

These and other objects and advantages of the invention will be better understood from the following description when taken in conjunction with the accompanying drawing. In the drawing wherein like reference numerals have been utilized to indicate like parts throughout:

Fig. 1 is a side elevational view partly in vertical section with certain parts broken away of an automobile jack made in accordance with and incorporating the principles of the present invention;

Fig. 2 is a view in horizontal section of the automobile jack of Fig. 1 substantially as seen in the direction of the arrows along the line 2—2 of Fig. 1;

Fig. 3 is an enlarged perspective view with certain parts broken away of the rack bar which forms a part of the lifting jack illustrated in Fig. 1; and Fig. 4 is a view in horizontal section substantially as seen in the direction of the arrows along the line 4—4 of Fig. 3.

Referring first to Fig. 1 of the drawing it will be seen that the lifting jack, which is generally designated by the numeral 10, comprises a base 12, a rack bar 14 and a housing 16, the housing 16 including therein the actuating mechanism 18 and an integral load lifting and engaging member 20.

The base 12 is made from a sheet metal stamping and as may be best seen in Fig. 2 is substantially square in shape. An outer support flange 22 is provided which extends completely around the base and joining flange 22 is an upstanding reinforcing rib 24 which extends completely around the base. Flange 22 and a central base portion 26 are adapted to lie upon and be supported by an underlying support surface. Raised central part 28 is formed in the center of the base 12 and spaced slightly rearwardly and provided with a recessed portion 30. A plurality of reinforcing ribs extends from the corners of base 12 to the central raised part 28.

A first apertured plate 32 is welded in position as at 34 over the recess 30 and has upstanding walls 36 and 38 formed along the edges thereof. These walls 36 and 38 support a second apertured plate 40 spaced from the first apertured plate 32. A pair of reinforcing depressions 42 are formed at the junction of plate 40 with each of the sides 36 and 38.

The apertures in plates 32 and 40 are shaped complementary to the cross section of rack bar 14. The aperture in upper plate 40 is spaced rearwardly with respect to the aperture in lower plate 32 so that the rack bar 14 is normally inclined rearwardly at an angle of from one to two degrees with respect to the vertical. This rearward inclination of the rack bar 14 tends to counteract any tendency of the jack to tip forward when a load is engaged by the load support 20.

As may be best seen in Figs. 3 and 4 rack bar 14 has a modified Y-shaped in cross section. More specifically rack bar 14 has a leg 44 which is normally pointed rearwardly during use and narrows toward the free end thereof. Formed integral with leg 44 is a pair of diverging arms 46 and 48 whose median lines form an angle of approximately 35° with the center line of leg 44. Formed on the outer end of arms 46 and 48 are outturned flanges 50 and 52, respectively. Flanges 50 and 52 are somewhat thicker than arms 46 and 48 but are slightly less thick than body 44.

Certain of the portion of the length of body 44 has formed thereon a plurality of teeth 54. The teeth 54 are defined by a surface 56 inclined only slightly with respect to the horizontal and a surface 58 which is inclined in a substantial amount with respect to the horizontal and meets surface 56 at substantially a right angle. The teeth instead of being pointed have a flat rearwardly extending surface 60 which is part of the original wall of the body 44.

The Y-bar 14 is formed first by rolling to provide a piece having a cross section shown in the lower portion of Fig. 3. The teeth 54 are then formed by a simple one stroke stamping operation. This method of forming the teeth is made possible by the relatively narrow width of body 44. An ear 62 is formed on flange 50 adjacent one end thereof, ear 62 being bent rearwardly toward body 44 and serving to limit the distance that housing 16 can move upwardly upon rack bar 14.

Housing 16 is made of a single piece of sheet metal appropriately die stamped and folded. More particularly housing 16 includes a pair of side walls 64 and 66 which are positioned substantially parallel adjacent their rear portions and are interconnected along their lower edges by a rear wall 68. The side walls 64 and 66 are deformed inwardly as at 70 and 72, respectively, to conform to the outer periphery of the Y-shaped rack bar 14. The housing is then flared outwardly to form side walls 74 and 76 which lie beside and encompass flanges 50 and 52 on bar 14. The forward edges of walls 74 and 76 are provided with inturned front wall portions 78 and 80, respectively.

Load lifting member 20 is formed from integral and forwardly extending side walls 82 and 84 formed, respectively, on side walls 74 and 76 and on their upper edges are provided with inturned and horizontally disposed and overlapped pieces 86 and 88. Pieces 86 and 88 cooperate to form the upper surface of load support member 20 and are normally inclined slightly upwardly as may be best seen in Fig. 1 so that a bumper or other automobile projection is trapped at the junction of load lifting member 20 and the front walls 78—80.

The housing 16 is held in assembled position by a rivet 90 which extends through the lower portions of walls 82 and 84 which are bent inwardly toward each other at this point.

The actuating mechanism 18 includes a sheet metal stamping handle 92 which is shaped to receive a rod 94 and is pivoted on housing 16 as at 96. Handle 92 has also pivoted thereto as at 98 an upper pawl 100. A lower pawl 102 is pivoted to handle 92 as at 104. Spring 106 is pivotally connected to pawl 100 at 108 and to pawl 102 at point 110.

During a lifting operation of the mechanism 18 the pawls 100 and 102 are urged into engagement with rack bar 14 by a finger 112 pivotally mounted on housing 16 as at 114 and pressing against spring 106. In a lifting operation pawl 100 is first engaged on a tooth 54 of Y-bar 14 and bar 94 is lifted upwardly. This lifts pawl 102 upwardly to the next tooth 54 and raises the housing and load support 20. Bar 94 is then pushed downwardly to move pawl 100 upwardly to engage the next higher tooth 54 on Y-bar 14. This cycle of operation is thereafter repeated to raise housing 14 and load lifting member 20 upwardly along Y-bar 14. Proper operation of spring 106 is insured by an inwardly directed depression 116 which urges the spring and the lower pawl into proper operative position.

To lower the housing 14 and load support 20 finger 112 is rotated in a counterclockwise direction until its nose is out of engagement with spring 106. This then reverses the operation of the ratchet mechanism and permits lowering of the jack.

It will be seen that there has been provided an improved automobile lifting jack in which the rack bar has a modified Y-shape. This rack bar can be easily and inexpensively manufactured by rolling to the proper shape and thereafter forming the teeth thereon by a simple one stroke stamping operation. The Y-bar of this invention is stronger than other bars such as V-shaped bars or solid bars of the same weight. The arms 46—48 and the flanges 50—52 provide a simple means for preventing rotation of the housing 16 about the rack bar 14.

Although a preferred embodiment of the invention has been shown for purposes of illustration it is to be understood that the invention is to be limited only as set forth in the following claims.

I claim:

1. A rack bar for use in a lifting jack comprising a body, the rear free edge of said body being narrower than the forward edge thereof to facilitate the formation of teeth therealong, a pair of arms formed integral with said body along the wider forward edge thereof and diverging outwardly therefrom and symmetrical with the center line of said body, the thickness of said arms being less than the smallest dimension of said body, an outwardly extending flange formed on the free edge of each arm and extending substantially perpendicular to the center line of said body, the width of said flanges being greater than the width of said arms, and a plurality of teeth formed on the rear narrower edge of said body, the upper side of each tooth being defined by a surface inclined at a relatively small angle with respect to the horizontal when the rack bar is in operative vertical position, the lower side of each tooth being defined by a plane disposed at a relatively large angle with respect to the horizontal when the rack bar is in operative position and being disposed at an angle of approximately 90° with the plane defining the upper side of the tooth.

2. A lifting jack comprising a rack bar of generally Y-shaped configuration, means supporting said rack bar in a substantially vertical operative position; said rack bar including a central body portion of maximum thickness having front arms diverging from one end thereof and a rear arm disposed centrally of the body portion and extending rearwardly from said diverging arms, the front arms diverging from the median line of the rear arm at angles to subtend therebetween an angle not exceeding 90° and having laterally bent end portions, the rear arm being of less transverse thickness than that of the body portion to facilitate the formation of teeth along the free edge thereof, a plurality of teeth formed transversely through the free edge of said rear arm remote from the ends of said diverging front arms, a light-weight housing shaped to receive said rack bar and mounted thereon; said housing including a front wall traversing the space between the ends of said diverging arms and having portions shaped to engage the laterally bent end portions of said diverging arms whereby to reduce the areas of contact between the housing and the rack bar with resultant reduction in frictional resistance to movement of the housing relative to the rack bar, a lifting mechanism carried by the housing and engageable with the teeth of the rack bar, and a load-lifting member carried by said housing.

3. A lifting jack as claimed in claim 2, wherein the rear arm is tapered in transverse cross section from said body portion to a narrower free edge on which the teeth are formed.

4. A lifting jack as claimed in claim 2, wherein the front arms diverge from the median line of the rear arm at angles to subtend therebetween an angle approximating 70°.

5. A lifting jack comprising a rack bar of generally Y-shaped configuration, means supporting said rack bar in a substantially vertical operative position; said rack bar including a central body portion of maximum thickness having front arms diverging from one end thereof and a rear arm disposed centrally of the body portion and extending rearwardly from said diverging arms, the front arms diverging from the median line of the rear arm at angles to subtend therebetween an angle approximating 70°, the rear arm being of less transverse thickness than that of the body portion to facilitate the formation of teeth along the free edge thereof, a plurality of teeth cut transversely through the free edge of said rear arm remote from the ends of said diverging front arms, a lightweight housing shaped to receive said rack bar and mounted thereon; said housing including a front wall traversing the space between the ends of said diverging arms and having opposing side wall portions shaped to engage only the end portions of said diverging arms whereby to reduce the areas of contact between the housing and the rack bar with resultant reduction in frictional resistance to movement of the housing relative to the rack bar, a lifting mechanism carried by the housing and engageable with the teeth of the rack bar, and a load-lifting member carried by the housing.

(References on following page)

References Cited in the file of this patent

UNITED STATES PATENTS

| | | |
|---|---|---|
| 463,385 | Griffin | Nov. 17, 1891 |
| 961,909 | Templeton | June 21, 1910 |
| 968,474 | Harrah | Aug. 23, 1910 |
| 1,584,549 | Keating | May 11, 1926 |
| 2,015,433 | Meyers | Sept. 24, 1935 |
| 2,396,103 | Kais | Mar. 5, 1946 |
| 2,463,771 | Hunz | Mar. 8, 1949 |
| 2,525,805 | Kirkpatrick | Oct. 17, 1950 |

FOREIGN PATENTS

| | | |
|---|---|---|
| 478,442 | Great Britain | Jan. 19, 1938 |
| 672,060 | Great Britain | May 14, 1952 |